United States Patent [19]

Mochimaru et al.

[11] Patent Number: 5,291,339
[45] Date of Patent: Mar. 1, 1994

[54] SCHWARZSCHILD OPTICAL SYSTEM

[75] Inventors: Shoichiro Mochimaru; Yoshiaki Horikawa, both of Hachiouji; Mikiko Kato, Urawa, all of Japan

[73] Assignee: Olympus Optical Co., Ltd., Tokyo, Japan

[21] Appl. No.: 800,236

[22] Filed: Nov. 29, 1991

[30] Foreign Application Priority Data

Nov. 30, 1990 [JP] Japan ................. 2-334977
Nov. 30, 1990 [JP] Japan ................. 2-334978

[51] Int. Cl.⁵ ............... G02B 21/04; G02B 17/06; G21K 7/00
[52] U.S. Cl. ........................ 359/859; 378/43
[58] Field of Search .......... 359/859, 326, 729; 378/43

[56] References Cited

U.S. PATENT DOCUMENTS

| | | | |
|---|---|---|---|
| 2,916,966 | 12/1959 | Nomarski et al. | 359/859 |
| 4,089,595 | 5/1978 | Simmons et al. | 359/859 |
| 4,097,125 | 6/1978 | Suzuki | 359/859 |
| 4,411,499 | 10/1983 | Abel et al. | 359/648 |
| 4,562,583 | 12/1985 | Hoover et al. | 378/85 |
| 4,757,354 | 7/1988 | Sato et al. | 359/731 |
| 4,861,148 | 8/1989 | Sato et al. | 359/366 |
| 4,863,253 | 9/1985 | Shafer | 359/859 |
| 5,022,064 | 6/1991 | Iketaki | 378/43 |
| 5,061,850 | 10/1991 | Kelly et al. | 250/287 |
| 5,107,526 | 4/1992 | Hoover | 378/43 |

FOREIGN PATENT DOCUMENTS

61-102600 5/1986 Japan .
61-292600 12/1986 Japan .

OTHER PUBLICATIONS

Paul Erdos, "Mirror Anastigmat with Two Concentric Spherical Surfaces", Journal of the Optical Society of America, vol. 49, No. 9, pp. 877–886, Sep. 1959.

I. Lovas et al, "Design and Assembly of a High Resolution Schwarzschild Microscope for Soft X-rays", SPIE, vol. 316, pp. 90–97, (1981).

J. A. Trail et al, "X-ray Microscope Using Multilayer Optics with a Laser-Produced Plasma Source", SPIE, vol. 563, Applications of Thin-Film Multilayered Structures to Figured X-ray Optics, pp. 90–97, 1985.

*Primary Examiner*—Jon W. Henry
*Attorney, Agent, or Firm*—Cushman, Darby & Cushman

[57] ABSTRACT

A Schwarzschild optical system comprising a concave mirror having an opening formed at the center thereof and a convex mirror arranged in opposite to the opening of the concave mirror, and has a numerical aperture of at least 0.25 on the object side, the concave mirror being formed to have an aspherical surface. This Schwarzschild optical system has a relatively large numerical aperture, a relatively large departure between the centers of curvature of the concave mirror and the convex mirror, and favorably corrected aberrations.

2 Claims, 6 Drawing Sheets

SPHERICAL ABERRATION

SPHERICAL ABERRATION

SCHWARZSCHILD OPTICAL SYSTEM

BACKGROUND OF THE INVENTION a) Field of the invention

The present invention relates to a Schwarzschild optical system which is to be applied as an objective optical system for X-ray microscopes utilizing wavelengths within the soft X-ray zone.

b) Description of the prior art

Optical microscopes are conventionally used as instruments for observing small objects. In order to obtain an instrument which has higher resolution for observing smaller objects, it is desirable to use an objective lens system having a numerical aperture as large as possible since the resolution of the observing instrument is limited by the wavelength of the light to be utilized for observation and the numerical aperture of the objective lens system used therein (the so-called diffraction limit). However, since the numerical aperture of the objective lens system can be enlarged only within a certain limit, there an inevitable tendency, for observing smaller objects, to shorten the wavelength of the light to be utilized for observation.

Under the recent circumstances where X-ray sources of relatively good qualities are available and X-ray microscopes are developed for satisfying the increasing desire to observe smaller objects, there is produced a demand for objective lens systems which have good performance for imaging the X-ray.

As an objective optical system which is usable for imaging the X-ray, there is conventionally known the Schwarzschild optical system. This optical system consists, as shown in FIG. 1, of a large concave mirror A which has a spherical surface having an opening formed at the center thereof and a small convex mirror B which has a spherical surface arranged opposite to the opening of the concave mirror A so that a light beam emitted from an object point O is reflected by the concave mirror A and the convex mirror B in this order, and then is focused onto an image point I. (This objective optical system may be used in such a position that the image point I and the object point O are replaced with each other.) The X-ray microscopes which use the optical system described above as an objective optical system are classified into an imaging type microscope and a scanning type microscope. The scanning type microscope comprises, as shown in FIG. 2, an X-ray source 1, a pinhole 2, an objective optical system 3, a sample 4 which is arranged to be freely movable in the direction perpendicular to the optical axis, and an X-ray detector 5; these members being coaxially arranged. The scanning type X-ray microscope is constructed to detect an image of the sample 4 while condensing the X-ray beam having passed through the pinhole 2 onto the sample 4 as a small spot and scanning a predetermined range of the sample 4 by moving the sample 4 on a plane perpendicular to the optical axis.

On the other hand, the imaging type X-ray microscope comprises, as shown in FIG. 3, an X-ray source 1, a condenser lens 6, a sample 4, an objective optical system 3 and a detector 5 which are coaxially arranged. An X-ray beam emitted from the X-ray source 1 is focused by the condenser lens 6 as a spot having a certain size on a predetermined area on the sample 4. The X-ray beam is transmitted through or is diffracted by the sample 4, and then is focused by the objective optical system 3 to form a magnified image of the sample 4 on the detector 5.

As for correction of aberrations in these objective optical systems, it is sufficient to correct aberrations only within a narrow zone in the vicinity of the optical axis for the objective optical system used in the scanning type microscope in which the sample is moved, whereas aberrations must be corrected within a relatively broad range up to a certain image height in the objective optical system arranged in the imaging type microscope.

Accordingly, the requirements to be satisfied by objective lens systems to be used for the X-ray microscopes or the key points for designing these objective optical systems can be summarized as follows:

(1) Aberrations are corrected favorably;
(2) The objective optical systems have large numerical apertures; and
(3) Optical performance of the objective optical systems is not adversely affected by misalignment of the mirrors.

For satisfying the requirement (3) out of the requirements mentioned above, it is more advantageous to select a non-concentric type Schwarzschild optical system in which the center of curvature of the concave mirror is not coincident with that of the convex mirror since this type of objective optical system has performance less affected by the misalignment of the mirrors.

As the non-concentric type Schwarzschild optical system, there are conventionally known the optical systems proposed by I. Lovas (High Resolution Soft X-ray Optics, SPIE vol. 316 (1981)) and those proposed by J. A. Trail (SPIE vol. 563 (1985) p90). When the departure between the centers of curvature of the two mirrors is expressed as a difference between a distance W2 from the object point 0 to the center of curvature C2 of the concave mirror and a distance W1 from the object point 0 to the center of curvature C1 of the convex mirror which is in a form normalized to focal length f of the objective lens system as a whole, i.e., $(W_2 - W_1)/f$ (this value is referred to as departure between centers DC), the objective optical systems disclosed by the above-mentioned SPIE vol. 316 have DC's of $-0.022$ to $-0.07$ and a numerical aperture NA of 0.2 on the object side (on the shorter conjugate side), whereas the objective optical systems disclosed by the above-mentioned SPIE vol. 563 have DC's of the order of 0.06 and numerical apertures NA's of 0.2, 0.3 and 0.4 on the object side.

A larger departure between centers DC is more desirable for lessening the influence due to the misalignment of the mirrors, but too large a departure between centers DC makes it more difficult to correct aberrations. It is therefore necessary to determine design parameters for an objective optical system while considering good balance between the influence due to misalignment of the mirrors and the correction of aberrations. Though each of the two mirrors is designed as a spherical mirror in the conventional Schwarzschild optical systems, aberrations cannot be corrected sufficiently only with spherical mirrors in Schwarzschild optical systems which have large numerical apertures and large departures between centers.

SUMMARY OF THE INVENTION

In view of the problems described above, it is a primary object of the present invention to provide a Schwarzschild optical system which has a relatively large numerical aperture, a relatively large departure between centers and favorably corrected aberrations.

In a first preferred formation of the present invention, the optical system comprises a concave mirror having an opening formed at the center thereof and a convex mirror arranged opposite to the opening of the concave mirror, and is characterized in that the optical system has a numerical aperture of at least 0.25 on the object side, that the concave mirror is formed to have an aspherical surface and that the optical system satisfies the conditions (1) and (2) which are mentioned below:

$$-0.065 \leq DC \leq -0.025, \quad DC=(W2-W1)/f \quad (1)$$

$$k \leq 0.35 \cdot (DC)^2 - 0.0005 \quad (2)$$

wherein the reference symbol DC represents the departure between centers, the reference symbol W2 designates the distance from the object point to the center of curvature of the convex mirror, the reference symbol W1 denotes the distance from the object point to the center of curvature of the concave mirror, the reference symbol f represents the focal length of the Schwarzschild optical system, and the reference symbol k designates a value which is given by the following formula:

$$k=e^2/(1-e^2) \text{ when } k \text{ is larger than } 0, \text{ or}$$

$$K=-e^2 \text{ when } k \text{ is smaller than } 0.$$

wherein the reference symbol e represents the eccentricity of the aspherical surface of the concave mirror.

In a second preferred formation of the present invention, the optical system comprises a concave mirror having an opening formed at the center thereof and a convex mirror arranged opposite to the opening of the concave mirror, and is characterized in that the optical system has a numerical aperture of at least 0.25, that the concave mirror and the convex mirror are formed to have aspherical surfaces, and that the optical system satisfies the following conditions (3) through (6):

$$DC \leq -0.05, \quad DC=(W2-W1)/f \quad (3)$$

$$0.1/DC+1.0 \leq k_A \leq 0.075/DC+1.5 \quad (4)$$

$$-0.05 \leq k_B \leq 0.05 \quad (5)$$

$$|k_A| > |k_B| \quad (6)$$

wherein the reference symbols $k_A$ and $k_B$ represent values which are given by the following formulae:

$$k_A = e_A^2/(1-e_A^2) \text{ when } K_A \text{ is larger than } 0, \text{ or}$$

$$k_A = -e_A^2 \text{ when } k_A \text{ is smaller than } 0.$$

$$k_B = e_B^2/(1-e_B^2) \text{ when } k_B \text{ is larger than } 0, \text{ or}$$

$$k_B = -e_B^2 \text{ when } k_B \text{ is smaller than } 0.$$

wherein the reference symbol $e_A$ and $e_B$ designate the eccentricity of said convex mirror and the eccentricity of said concave mirror respectively.

Now, description will be made of the conditions which are to be satisfied by the optical system according to the present invention.

For the optical system according to the present invention, a numerical aperture of at least 0.25 is specified. This numerical aperture is required for obtaining a value of 50 nm or smaller as an inverse number of the spatial frequency which gives a Modulation Transfer Function (MTF) of 30% for the optical system since the theoretical resolution ($\lambda$/NA) determined on the basis of diffraction is 50 nm when the Schwarzschild optical system has a numerical aperture of 0.2 and the soft X-ray to be used for the optical system has a wavelength $\lambda$ of 10 nm.

When the optical system has such a large numerical aperture, the use of the aspherical surface exhibits the advantage described above. On a premise that the concave mirror has an aspherical surface for favorably correcting aberrations within a range to an object height of 0.3 mm when the distance IO from the object point 0 to the image point I is 1000 mm, examinations were made on composition of the optical system. In this case, it was necessary to satisfy the conditions (1) and (2) in the first formation or the conditions (3) and (4) in the second formation described above.

The condition (1) or (3) defines the departure between centers of the mirrors in the optical system. If the departure between centers is short enough to exceed the upper limit of this condition, the imaging performance of the optical system will be degraded remarkably by misalignment of the concave mirror and the convex mirror. If the departure between centers is long enough to exceed the lower limit of the condition (1) or (3), the degradation of the imaging performance due to misalignment will desirably be lessened, but it will be difficult to correct aberrations or obtain favorable imaging performance of the optical system.

The condition (2) defines shape of the aspherical surface to be formed on the concave mirror, whereas the conditions (4) through (6) define shapes of the aspherical surfaces to be formed on the concave mirror and the convex mirror respectively. Though the optical system according to the present invention uses aspherical surfaces which have relatively simple quadratic shapes, it will be difficult to correct aberrations when the relationship between eccentricity and departure between centers does not satisfy the condition (2) or the conditions (4) through (6), whereby the optical system will have degraded imaging performance or it will be difficult to obtain the required resolution of the optical system.

This and other objects as well as the features and advantages of the present invention will become apparent from the following detailed description of the preferred embodiments when taken in conjunction with the accompanying drawings.

DESCRIPTION OF THE PREFERRED EMBODIMENTS

Now, the present invention will be described in more detail below with reference to the preferred embodiments illustrated in the accompanying drawings. Since the Schwarzschild optical system according to the present invention remains unchanged from the conventional optical system in the fundamental arrangement of the concave mirror and the convex mirror, FIG. 1 will be used for the following description as a drawing illustrating the fundamental arrangement of the mirrors in the Schwarzschild optical system according to the present invention.

First embodiment

Magnification $= 100\times$, NA $= 0.34$, CD $= -0.05$, k of the concave mirror $= -4.24 \times 10^{-4}$. The distances shown in FIG. 1 have the values which are listed below:

| | |
|---|---|
| R1 | 19.58 |
| R2 | 10.30 |
| W1 | 8.96 |
| W2 | 8.46 |
| T | 1000.0 |
| f | 9.8 |
| | (Unit: mm) | wherein the reference symbols R1 and R2 represent the radii of curvature on the reference spheres of the concave mirror and the convex mirror respectively, and the reference symbol T designates the distance from the object point to the image point.

Figure 4:
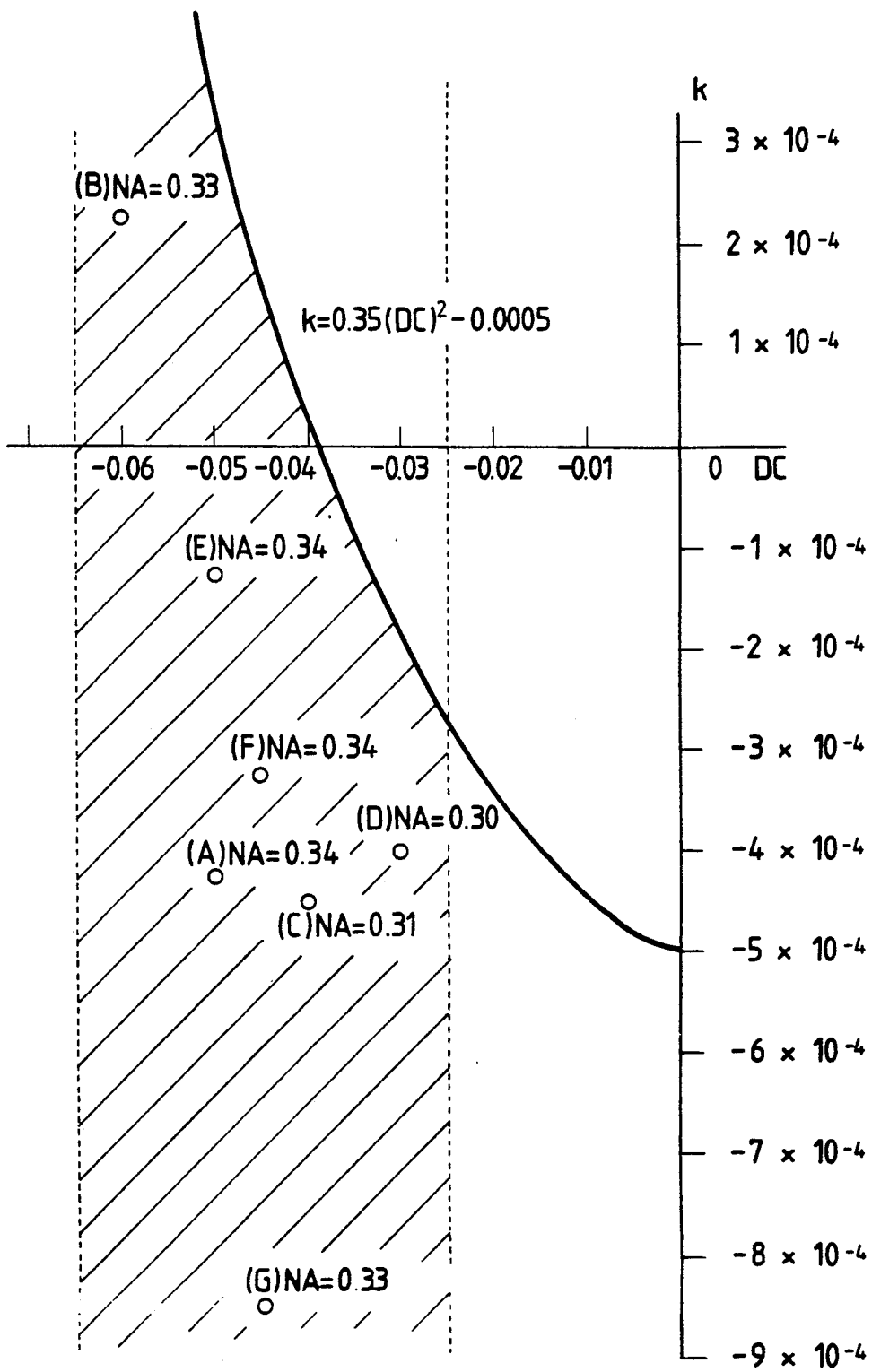
FIG. 4 is a graph illustrating a range of the conditions which are to be satisfied by the Schwarzschild optical system according to the present invention.

FIG. 4 visualizes the relationship of the departure between centers of the concave mirror and the convex mirror versus k, in the first through seventh embodiments, which are taken as the abscissa and the ordinate axes respectively. In the first embodiment, the relationship corresponds to the location of the white circle (A) shown in FIG. 4. Numerical apertures of the first through seventh embodiments are also specified in FIG. 4.

Figure 5:
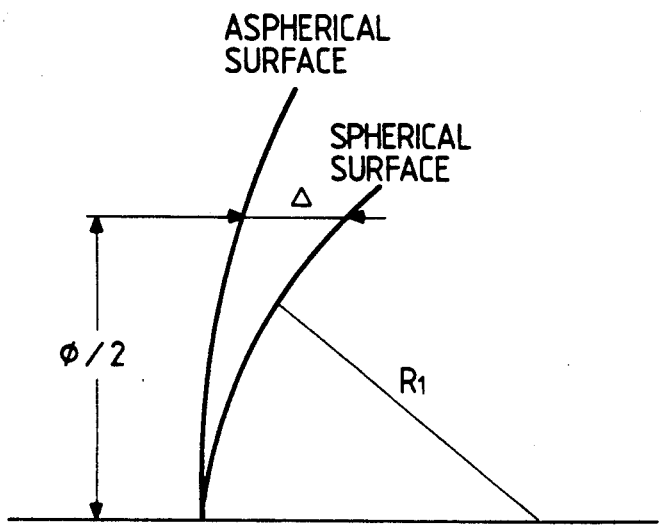
FIG. 5 is a diagram illustrating how to measure departure of an aspherical surface of a mirror from the reference sphere thereof.

FIG. 5 illustrates how to measure departure $\Delta$ of the aspherical surface of the concave mirror from the reference sphere thereof (the spherical surface which is in contact with the aspherical surface of interest on the optical axis). In the first embodiment, $\Delta$ is approximately 0.1 μm around the effective diameter ($\phi = 20$ mm) of the concave mirror.

Figure 6:
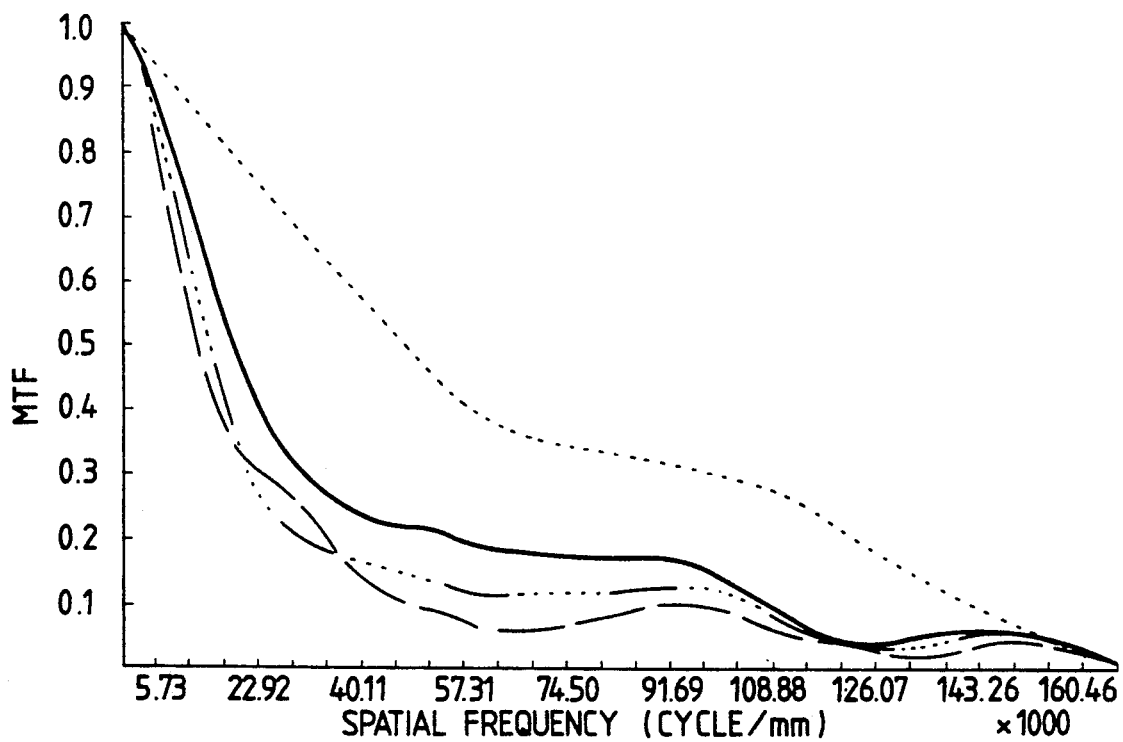
FIG. 6 shows graphs illustrating spatial frequency response in a first embodiment of the Schwarzschild optical system according to the present invention.

Further, FIG. 6 shows the spatial frequency response of the first embodiment, taking MTF (Modulation Transfer Function) as the ordinate and the spatial frequency as the abscissa. The dotted line indicates MTF at the aberration-free diffraction limit and the solid line indicates MTF at the axial image point (the point I in FIG. 1), whereas the dashed line and the six-point chain line indicate MTF's in the tangential and sagittal directions respectively at the offaxial image point (the point I' in FIG. 1) having an image height of 0.3 mm. As is clear from these graphs, MTF is 30% at a spatial frequency of approximately $22 \times 10^3$ (cycles/mm) for the offaxial image point and resolution is on the order of 45 nm which is higher than the level set as the target.

Figure 7:
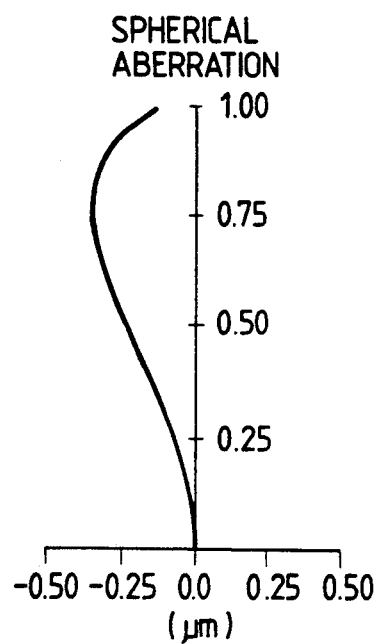
FIG. 7 is a curve illustrating spherical aberration in the first embodiment of the present invention.

Spherical aberration in the first embodiment is visualized in FIG. 7.

In order to clarity the effect of the aspherical surface, the first embodiment will be compared with the comparison example 1 which is composed only of spherical mirrors and designed for the same specifications such as magnification, numerical aperture as those of the first embodiment.

Comparison example 1

Magnification $= 100\times$, NA $= 0.34$, DC $= -0.05$, k of the concave mirror $= 0$ (spherical surface)

In the comparison example 1, the distances shown in FIG. 1 have the values listed below:

| | |
|---|---|
| R1 | 20.12 |
| R2 | 10.43 |
| W1 | 8.97 |
| W2 | 8.47 |
| T | 1000.0 |
| f | 9.8 |
| | (Unit: mm) |

Figure 9:
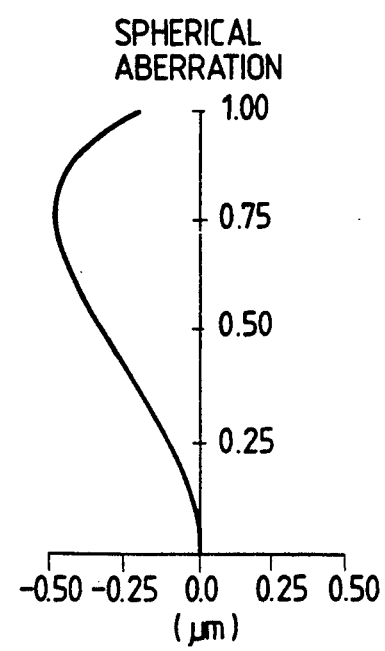
FIG. 9 is a curve illustrating spherical aberration in a first comparison example.
Figure 8:
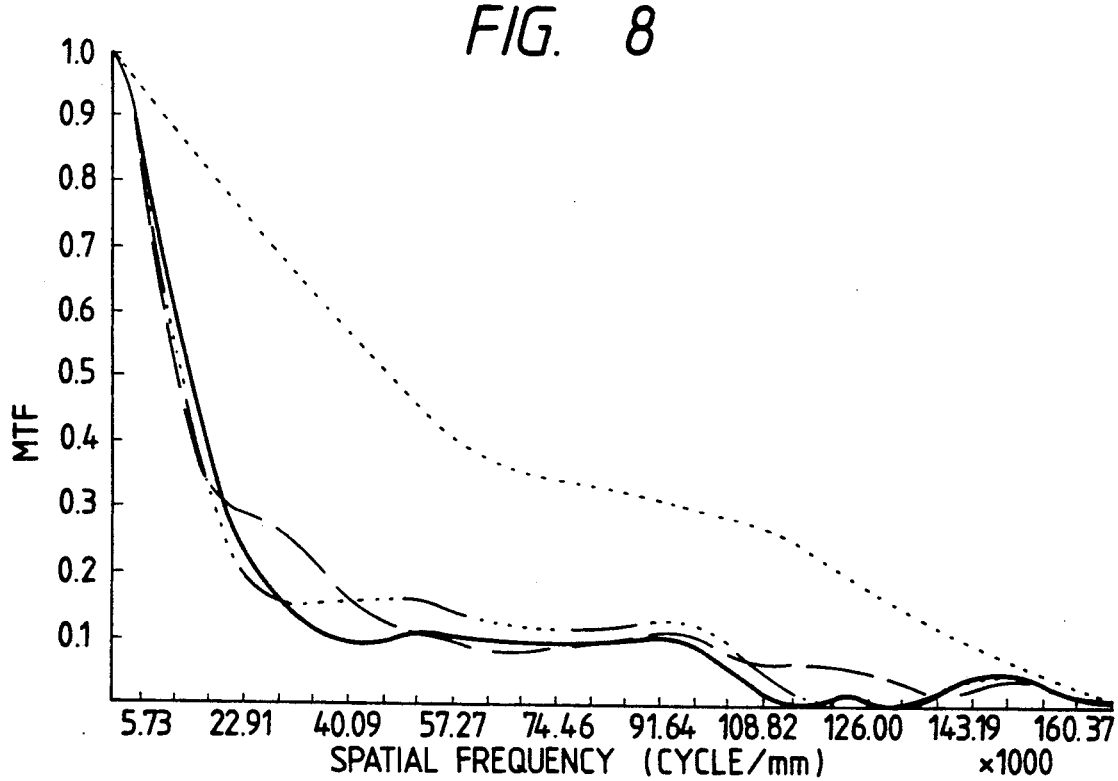
FIG. 8 shows curves illustrating spatial frequency response in a first comparison example.

The comparison example 1 has the spatial frequency response and the spherical aberration illustrated in FIG. 8 and FIG. 9 respectively. In FIG. 8, MTF becomes 30% at a level a little lower than $20 \times 10^3$ even for the axial image point and resolution is 55 nm which is lower than the target of 50 nm. Further comparison between FIG. 7 and FIG. 9 will clarify that spherical aberration is more remarkable in the comparison example 1 and the use of the aspherical surface makes it possible to obtain more favorable imaging performance.

Second embodiment

Magnification $= 100\times$, NA $= 0.33$, DC $= -0.06$, k of the concave mirror $= 2.36 \times 10^{-4}$ In the second embodiment, the distances shown in FIG. 1 have the values listed below:

| | |
|---|---|
| R1 | 16.64 |
| R2 | 9.66 |
| W1 | 8.69 |
| W2 | 8.09 |
| T | 1000.0 |
| f | 9.8 |
| | (Unit: mm) |

The second embodiment has the relationship between DC and k which is selected at the location of the white circle (B) shown in FIG. 4. Judging from the MTF of the second embodiment, resolution is on the order of 55 nm. A Schwarzschild optical system which is composed of two spherical mirrors for comparison with the second embodiment has resolution of 60 nm when it is estimated from the MTF thereof.

Third embodiment

Magnification=100×, NA=0.31, DC=−0.04, k of the concave mirror=−4.41×10$^{-4}$

In the third embodiment, the distances shown in FIG. 1 have the values tabulated below:

| | |
|---|---|
| R1 | 22.45 |
| R2 | 10.84 |
| W1 | 9.18 |
| W2 | 8.78 |
| T | 1000.0 |
| f | 9.8 |
| (Unit: mm) | |

For the third embodiment, the relationship between DC and k is selected at the location of the white circle (C) shown in FIG. 4. A Schwarzschild optical system which is composed only of spherical mirrors for comparison with the third embodiment has resolution of 48 nm when judged from the MTF thereof.

Fourth embodiment

Magnification=100×, NA=0.30, DC=−0.03, k of the concave mirror=−4.08×10$^{-4}$

In the fourth embodiment, the distances shown in FIG. 1 have the values tabulated below:

| | |
|---|---|
| R1 | 24.99 |
| R2 | 11.25 |
| W1 | 9.38 |
| W2 | 9.08 |
| T | 1000.0 |
| f | 9.8 |
| (Unit: mm) | |

The relationship between DC and k which is selected for the fourth embodiment corresponds to the location of the white circle (D) shown in FIG. 4.

Judging from MTF, the fourth embodiment has resolution on the order of 43 nm. An example of a Schwarzschild optical system which is composed only of spherical mirrors for comparison with the fourth embodiment has resolution of 47 nm when estimated from the MTF thereof.

Fifth embodiment

Magnification=200×, NA=0.34, DC=−0.05, k of the concave mirror=−1.14×10$^{-4}$

In the fifth embodiment, the distances shown in FIG. 1 have the values which are listed in the following table:

| | |
|---|---|
| R1 | 17.80 |
| R2 | 9.36 |
| W1 | 8.10 |
| W2 | 7.65 |
| T | 1800.0 |
| f | 8.9 |
| (Unit: mm) | |

For the fifth embodiment, the relationship between DC and k is selected at the location indicated by the white circle (E) shown in FIG. 4.

When estimated from MTF, the fifth embodiment has resolution on the order of 38 nm. A Schwarzschild optical system which is composed only of spherical mirrors for comparison with the fifth embodiment has resolution of 41 nm when estimated from the MTF thereof.

Sixth embodiment

Magnification=200×, NA=0.34, DC=−0.045, k of the concave mirror=−3.37×10$^{-4}$

In the sixth embodiment, the distances shown in FIG. 1 have the values which are listed in the following table:

| | |
|---|---|
| R1 | 19.04 |
| R2 | 9.60 |
| W1 | 8.22 |
| W2 | 7.82 |
| T | 1800.0 |
| f | 8.9 |
| (Unit: mm) | |

The sixth embodiment has the relationship between DC and k which corresponds to the location of the white circle (F) shown in FIG. 4.

When estimated from MTF, the sixth embodiment has resolution on the order of 52 nm. An example of Schwarzschild optical system which is composed only of spherical mirrors for comparison with the sixth embodiment has resolution of 61 nm as judged from the MTF thereof.

Seventh embodiment

Magnification=200×, NA=0.33, DC=−0.045, k of the concave mirror=−8.45×10$^{-4}$

Figure 1:
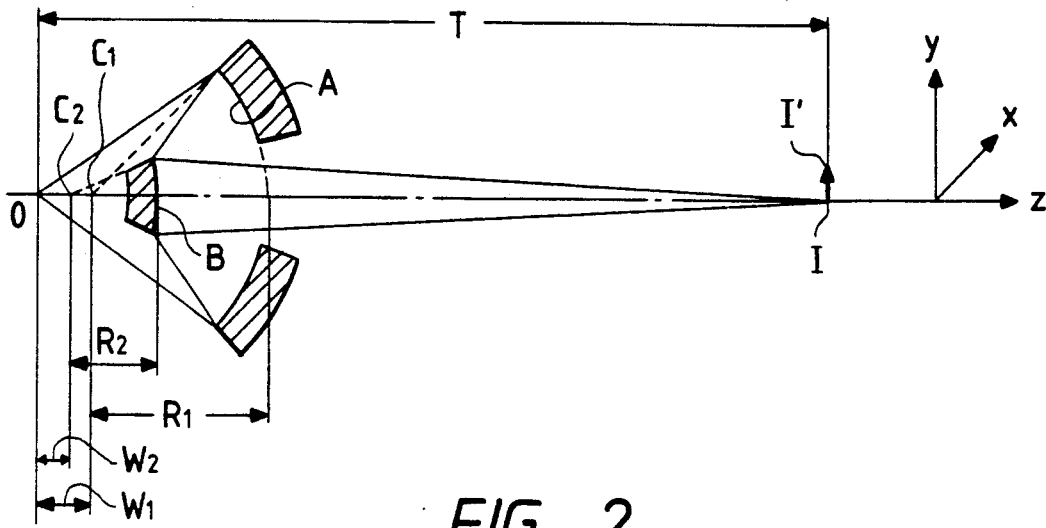
FIG. 1 is a sectional view illustrating the composition of the conventional non-concentric type Schwarzschild optical system.
Figure 2:
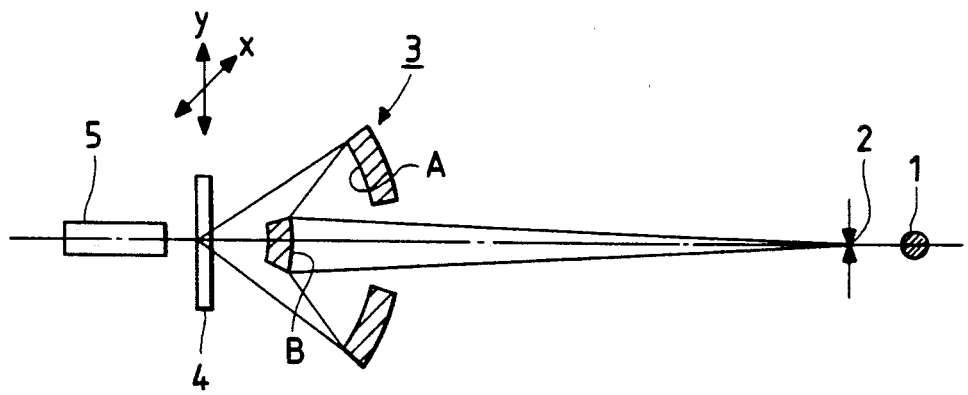
FIG. 2 is a sectional view illustrating the composition of the optical system for the conventional scanning type X-ray microscope.
Figure 3:
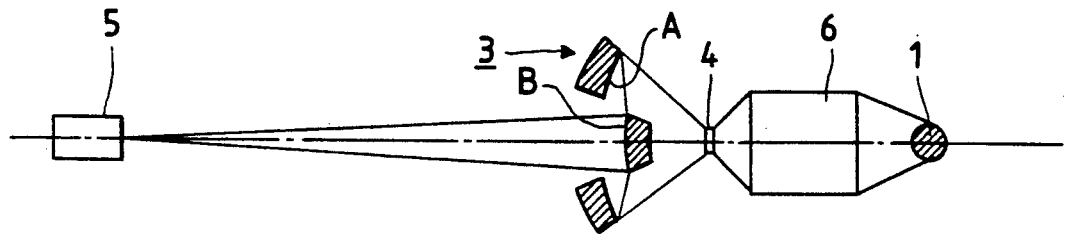
FIG. 3 is a sectional view illustrating the composition of the optical system for the conventional imaging type X-ray microscope.

In the seventh embodiment, the distances shown in FIG. 1 are set at the values which are listed in the following table:

| | |
|---|---|
| R1 | 18.50 |
| R2 | 9.47 |
| W1 | 8.21 |
| W2 | 7.81 |
| T | 1800.0 |
| f | 8.9 |
| (Unit: mm) | |

The relationship between DC and k which is selected for the seventh embodiment corresponds to the location of the white circle (G) shown in FIG. 4. The seventh embodiment has resolution on the order of 29 nm as judged from the MTF thereof. An example of a Schwarzschild optical system which is prepared only with spherical mirrors has resolution of 50 nm as estimated from the MTF thereof.

Eighth embodiment

Magnification=100×, NA=0.03, DC=−0.06, k of the convex mirror=−0.017, k of the concave mirror=−0.0019

For the eighth embodiment, the distances shown in FIG. 1 are selected at the values listed in the table shown below:

| | |
|---|---|
| R1 | 16.27 |
| R2 | 9.55 |
| W1 | 8.68 |
| W2 | 8.08 |
| T | 1000.0 |
| f | 9.8 |

Figure 10:
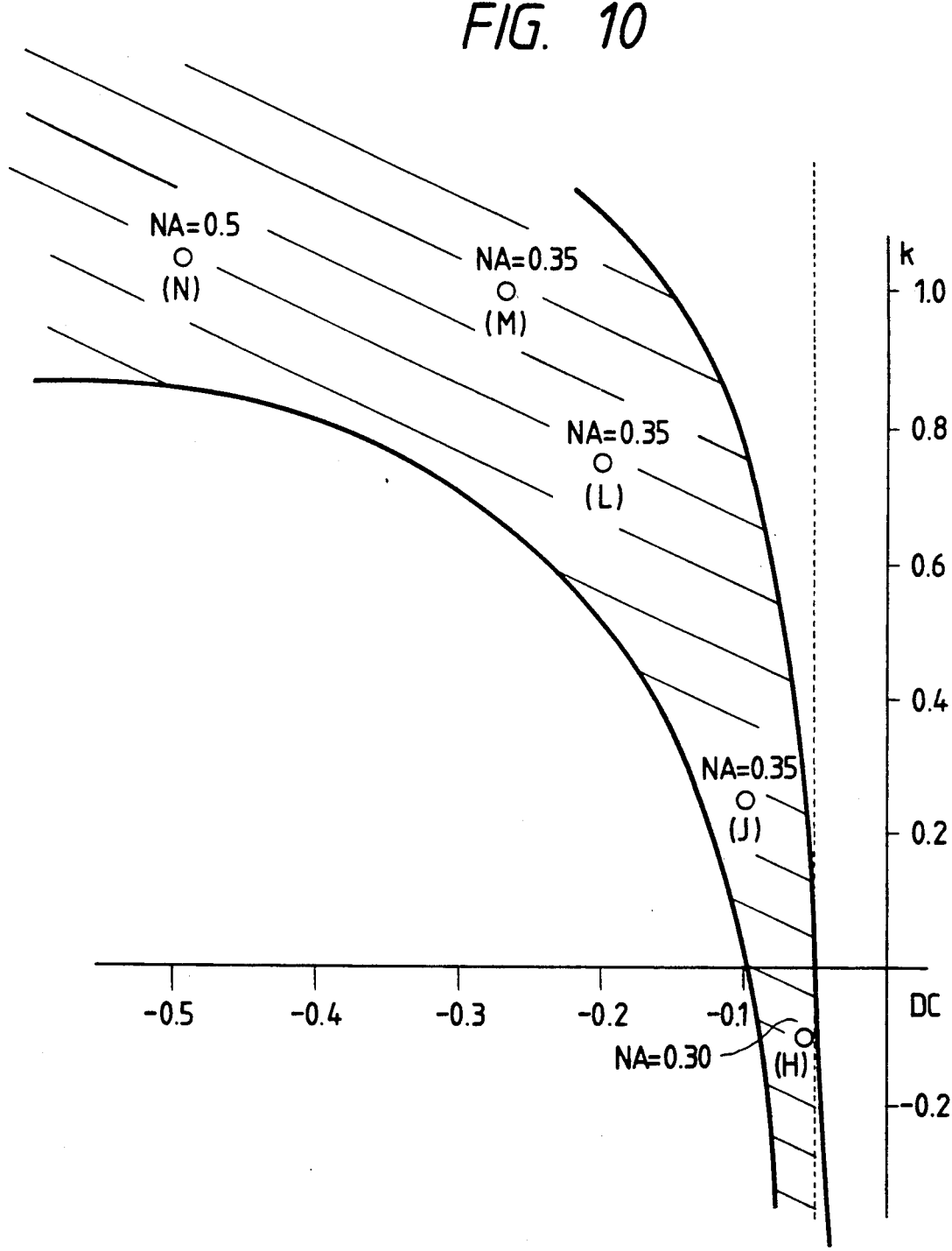
FIG. 10 is a graph illustrating a range of conditions which are different from those shown in FIG. 4 and are to be satisfied by the Schwarzschild optical system according to the present invention.

FIG. 10 visualizes the relationship of departure between centers of the concave mirror and the convex mirror versus k in the eighth through twelfth embodiments, taking the departure between centers and k as the abscissa and the ordinate respectively. In the eighth embodiment, the relationship between DC and k corresponds to the location of the white circle (H) shown in FIG. 10. FIG. 10 also specifies the numerical apertures adopted for the eighth through twelfth embodiments.

Figure 11:
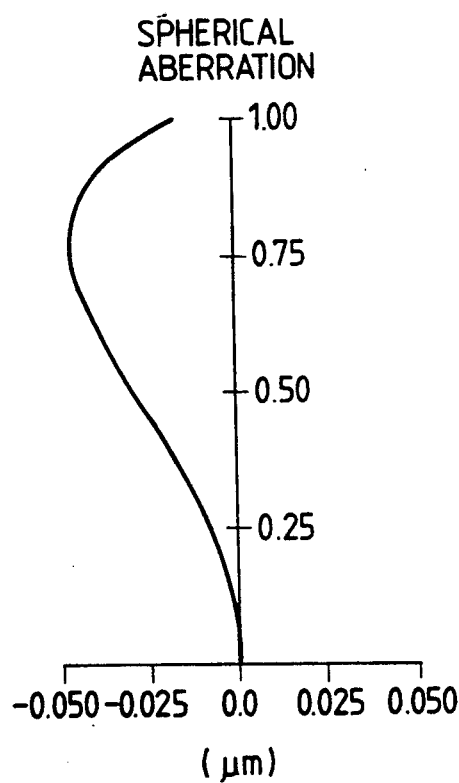
FIG. 11 is a curve illustrating spherical aberration in an eighth embodiment of the Schwarzschild optical system according to the present invention.

In the eighth embodiment, the resolution which is determined dependently on an inverse number of the spatial frequency giving an MTF of 30% is on the order of 44 nm at the offaxial image point. Spherical aberration in the eighth embodiment is illustrated in FIG. 11.

In order to clarify the effect of the aspherical surface, the eighth embodiment will be compared below with a second example of a Schwarzschild optical system which is composed only of spherical mirrors and designed for the same specifications such as magnification and numerical aperture as those for the eighth embodiment.

Comparison example 2

Magnification=100×, NA=0.30, DC=−0.06, both the convex mirror and the concave mirror=spherical mirrors For the comparison example 2, the values listed in the table shown below are selected as the distances shown in FIG. 1:

| | |
|---|---|
| R1 | 16.24 |
| R2 | 9.54 |
| W1 | 8.68 |
| W2 | 8.08 |
| T | 1000.0 |
| f | 9.8 |

(Unit: mm)

Figure 12:
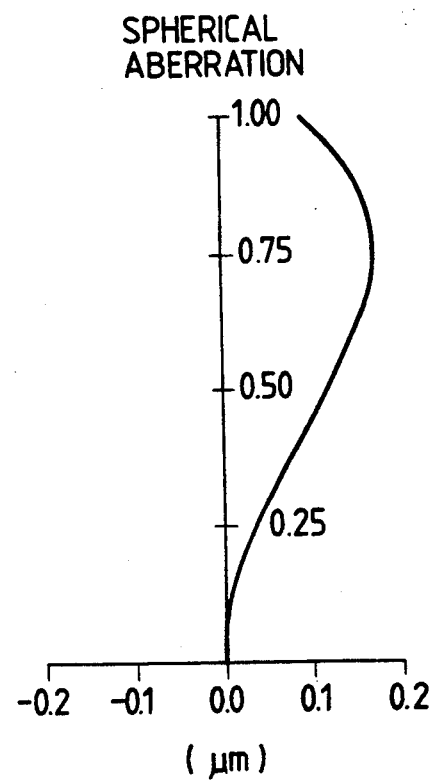
FIG. 12 is a curve illustrating spherical aberration in a second comparison example which is to be compared with the eighth embodiment of the present invention.

Spherical aberration of the comparison example 2 is illustrated in FIG. 12. In the comparison example 2, resolution which is determined dependently on an inverse number of the spatial frequency giving an MTF of 30% is on the order of 50 nm at the offaxial image point.

Comparison between the eighth embodiment and the comparison example 2 will clarify that the eighth embodiment is better in both resolution and spherical aberration that the comparison example 2, or that the use of the aspherical surfaces provides a remarkable effect.

Ninth embodiment

Magnification=100×, NA=0.35, DC=−0.1, k of the convex mirror=+0.245, k of the concave mirror=+0.027

For the ninth embodiment, the values listed in the table shown below are selected as the distances shown in FIG. 1:

| | |
|---|---|
| R1 | 25.94 |
| R2 | 12.04 |
| W1 | 8.29 |
| W2 | 7.29 |
| T | 1000.0 |
| f | 9.8 |

(Unit: mm)

In the ninth embodiment, the relationship between DC and k is selected at the location of the white circle (J) shown in FIG. 10. The ninth embodiment has resolution on the order of 40 nm as estimated from the MTF thereof. When the distance between centers of the concave mirror and the convex mirror is prolonged to −0.1 or so in a Schwarzschild optical system which comprises a spherical mirror, spherical aberration will be too remarkable, thereby making it impossible to estimate resolution of this optical system from the MTF thereof.

Tenth embodiment

Magnification=100×, NA=0.35, DC=−0.2, k of the convex mirror=+0.777, k of the concave mirror=+0.0203

The distances shown in FIG. 1 which are selected for the tenth embodiment have the values which are listed in the following table:

| | |
|---|---|
| R1 | 96.15 |
| R2 | 17.02 |
| W1 | 7.63 |
| W2 | 5.63 |
| T | 1000.0 |
| f | 9.8 |

(Unit: mm)

For the tenth embodiment, the relationship between DC and k is selected at the location of the white circle (L) shown in FIG. 10. When estimated from MTF, the tenth embodiment has resolution on the order of 11 nm.

As for the departures from the reference spheres measured as illustrated in FIG. 5, the tenth embodiment selects a value of Δ on the order of 6 μm around the effective diameter (φ=72 mm) of the convex mirror and a small value of Δ on the order of 0.02 μm around the effective diameter of the convex mirror.

Eleventh embodiment

Magnification=100×, NA=0.35, DC=−0.26, k of the convex mirror=+0.916, k of the concave mirror=+0.013

In the eleventh embodiment, the distances shown in FIG. 1 have the values which are listed in the following table:

| | |
|---|---|
| R1 | 172.6 |
| R2 | 18.22 |
| W1 | 7.14 |
| W2 | 4.54 |
| T | 1000.0 |
| f | 9.9 |

(Unit: mm)

The relationship between DC and k which is selected for the eleventh embodiment corresponds to the location of the white circle (M) shown in FIG. 10. When judged from MTF, the eleventh embodiment has resolution on the order of 10 nm.

Twelfth embodiment

Magnification = 100×, NA = 0.5, DC = −0.5, k of the convex mirror = +1.07, k of the concave mirror = +0.014

The table shown below specifies the distances shown in FIG. 1 which are selected for the twelfth embodiment:

| | |
|---|---|
| R1 | 177.24 |
| R2 | 18.81 |
| W1 | 4.74 |
| W2 | −0.26 |
| T | 1000.0 |
| f | 9.9 |

(Unit: mm)

In the twelfth embodiment, the relationship between DC and k corresponds to the location of the white circle (N) shown in FIG. 10. When estimated from MTF, the twelfth embodiment has resolution on the order of 26 nm. In particular, when a large numerical aperture is selected as in the case of the twelfth embodiment, it is possible to reserve a large departure between centers of the concave mirror and the convex mirror.

A wavelength of 3.98 nm is selected as a standard for each of the embodiments described above. Geometrical optic aberrations constitute a cause for degradation of MTF in each of the embodiments.

As is understood from the foregoing description on the embodiments, it is possible to obtain Schwarzschild optical systems having favorable imaging performance by specifying magnifications, numerical apertures, focal lengths and distances from the object point to the image point to satisfy the conditions specified by the present invention.

What is claimed is:

1. A Schwarzschild optical system comprising a concave mirror having an opening formed at the center thereof and a convex mirror disposed opposite to the opening of said concave mirror, in which said optical system has a numerical aperture of at least 0.25 on the object side, said concave mirror is formed to have an aspherical surface and said optical system satisfies the following conditions (1) and (2):

$$-0.065 \leq DC \leq -0.025, \ DC = (W2-W1)/f \quad (1)$$

$$k \leq 0.35 \cdot (DC)^2 - 0.005 \quad (2)$$

wherein the reference symbol DC represents a departure between the centers of curvature of said concave mirror and said convex mirror, the reference symbol W1 denotes a distance from the object point to the center of curvature of said concave mirror, the reference symbol W2 designates a distance from the object point to the center of curvature of said convex mirror, the reference symbol f represents the focal length of said Schwarzschild optical system and the reference symbol k designates a value given by the following formula:

$$k = e^2/(1-e^2) \text{ when k is larger than 0, or}$$

$$k = -e^2 \text{ when k is smaller than 0.}$$

wherein the reference symbol e represents the eccentricity of said aspherical surface.

2. A Schwarzschild optical system comprising a concave mirror having an opening formed at the center thereof and a convex mirror disposed opposite to the opening of said concave mirror, in which said optical system has a numerical aperture of at least 0.25 on the object side, said concave mirror and said convex mirror are formed to have aspherical surfaces respectively, and said optical system satisfies the following conditions (3) through (6):

$$DC \leq -0.05, \ DC = (W2-W1)/f \quad (3)$$

$$0.1/DC + 1.0 \leq k_A \leq 0.075/DC + 1.5 \quad (4)$$

$$-0.05 \leq k_B \leq 0.05 \quad (5)$$

$$|k_A| > |k_B| \quad (6)$$

wherein the reference symbol DC represents a departure between the centers curvature of said concave mirror and said convex mirror, the reference symbol W1 denotes a distance from the object point to the center of curvature of said concave mirror, the reference symbol W2 designates a distance from the object point to the center of curvature of said convex mirror, the reference symbol f represents the focal length of said Schwarzschild optical system, and the reference symbols $k_A$ and $k_B$ represent the values given by the following formulae:

$$k_A = e_A^2/(1-e_A^2) \text{ when } k_A \text{ is larger than 0, or}$$

$$k_A = -e_A^2 \text{ when } k_A \text{ is smaller than 0.}$$

$$k_B = e_B^2/(1-e_B^2) \text{ when } k_B \text{ is larger than 0, or}$$

$$k_B = -e_B^2 \text{ when } k_B \text{ is smaller than 0.}$$

wherein the reference symbols $e_A$ and $e_B$ represent the eccentricities of the aspherical surfaces of said convex mirror and said concave mirror respectively.

* * * * *